United States Patent
Fontenot et al.

(10) Patent No.: US 7,870,370 B2
(45) Date of Patent: Jan. 11, 2011

(54) DETERMINING THERMAL CHARACTERISTICS OF INSTRUCTION SETS

(75) Inventors: Nathan D. Fontenot, Cedar Park, TX (US); Jacob L. Moilanen, Austin, TX (US); Joel H. Schopp, Austin, TX (US); Michael T. Strosaker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 11/960,592

(22) Filed: Dec. 19, 2007

(65) Prior Publication Data

US 2009/0164765 A1    Jun. 25, 2009

(51) Int. Cl.
G06F 7/38 (2006.01)
G06F 9/00 (2006.01)
G06F 9/44 (2006.01)
G06F 15/00 (2006.01)

(52) U.S. Cl. .................................................... 712/227
(58) Field of Classification Search ................... 712/227
See application file for complete search history.

(56) References Cited

U.S. PATENT DOCUMENTS

| 6,714,890 | B2 | 3/2004 | Dai |
| 2005/0216222 | A1 | 9/2005 | Inoue |
| 2005/0216775 | A1 | 9/2005 | Inoue |

OTHER PUBLICATIONS

Bellosa; The Benefits of Event-Driven Energy Accounting in Power-Sensitive Systems; 2000; ACM SIGOPS European Workshop; pp. 37-42.*
Merkel; Balancing Power Consumption in Multiprocessor Systems; 2006; EuroSys '06.*
Contreras; Power Preduction for Intel XScale Processors Using Performance Monitoring Unit Events; 2005; ISLPED'05.*
Tanenbaum; Structured Computer Organization; 1984; Prentice-Hall, pp. 10-12.*
Coskun, et al.; Temperature Aware Task Scheduling in MPSoCs; 2007; pp. 1659-1664; Sun Microsystems, San Diego.
Ho, et al.; Development and Evaluation of a Thermal Display for Material Identification and Discrimination; ACM Transactions on Applied Perception; Jul. 2007; pp. 1-24; vol. 4, No. 2, Article 13; ACM, Inc.; New York, NY, USA.
Merkel, et al.; Balancing Power Consumption in Multiprocessor Systems; EuroSys '06, Apr. 18-21, 2006; pp. 514-525; ACM; Leuven, Belgium.
Michaud, et al.; A Study of Thread Migration in Temperature-Constrained Multicores; ACM Transactions on Architecture and Code Optimization; Jun. 2007; pp. 1-28; vol. 4, No. 2, Article 9; ACM, Inc.; New York, NY, USA.

* cited by examiner

*Primary Examiner*—Eddie P Chan
*Assistant Examiner*—Corey Faherty
(74) *Attorney, Agent, or Firm*—Brandon C. Kennedy; Steven L. Bennett; Biggers & Ohanian, LLP (57) ABSTRACT

Methods, apparatus, and products for determining thermal characteristics of instruction sets comprising one or more computer program instructions executed by a computer processor are disclosed that include tracking, in a performance counter, a number of classes of instructions run during execution of a plurality of instruction sets; identifying, for each instruction set, from the performance counter, a number of each class of instructions run during execution of the instruction set; and ranking the instruction sets in dependence upon the number of each class of instructions run during execution of each instruction set and a profile of thermal characteristics of classes of instructions.

15 Claims, 4 Drawing Sheets

DETERMINING THERMAL CHARACTERISTICS OF INSTRUCTION SETS

BACKGROUND OF THE INVENTION

1. Field of the Invention

The field of the invention is data processing, or, more specifically, methods, apparatus, and products for determining thermal characteristics of instruction sets.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today typically include one or more computer processors capable of executing computer program instructions. Computer program instructions generate heat in the processor when executed. Some types of computer program instructions generate more heat than other types of computer program instructions. Floating point operations, for example, may generate more than load/store operations which in turn may generate more heat than integer math operations when executed by the computer processor. Heat generated by a computer system may cause malfunctions in hardware or performance degradation. Users often desire to manage heat generation by controlling the workflow of computer program instructions generating different amounts of heat. That is, controlling the order in which computer program instructions are executed may be useful in managing heat generation in computer processor. It would be useful therefore, to determining thermal characteristics of instruction sets to control such a workflow.

SUMMARY OF THE INVENTION

Methods, apparatus, and products for determining thermal characteristics of instruction sets comprising one or more computer program instructions executed by a computer processor are disclosed that include tracking, in a performance counter, a number of classes of instructions run during execution of a plurality of instruction sets; identifying, for each instruction set, from the performance counter, a number of each class of instructions run during execution of the instruction set; and ranking the instruction sets in dependence upon the number of each class of instructions run during execution of each instruction set and a profile of thermal characteristics of classes of instructions.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
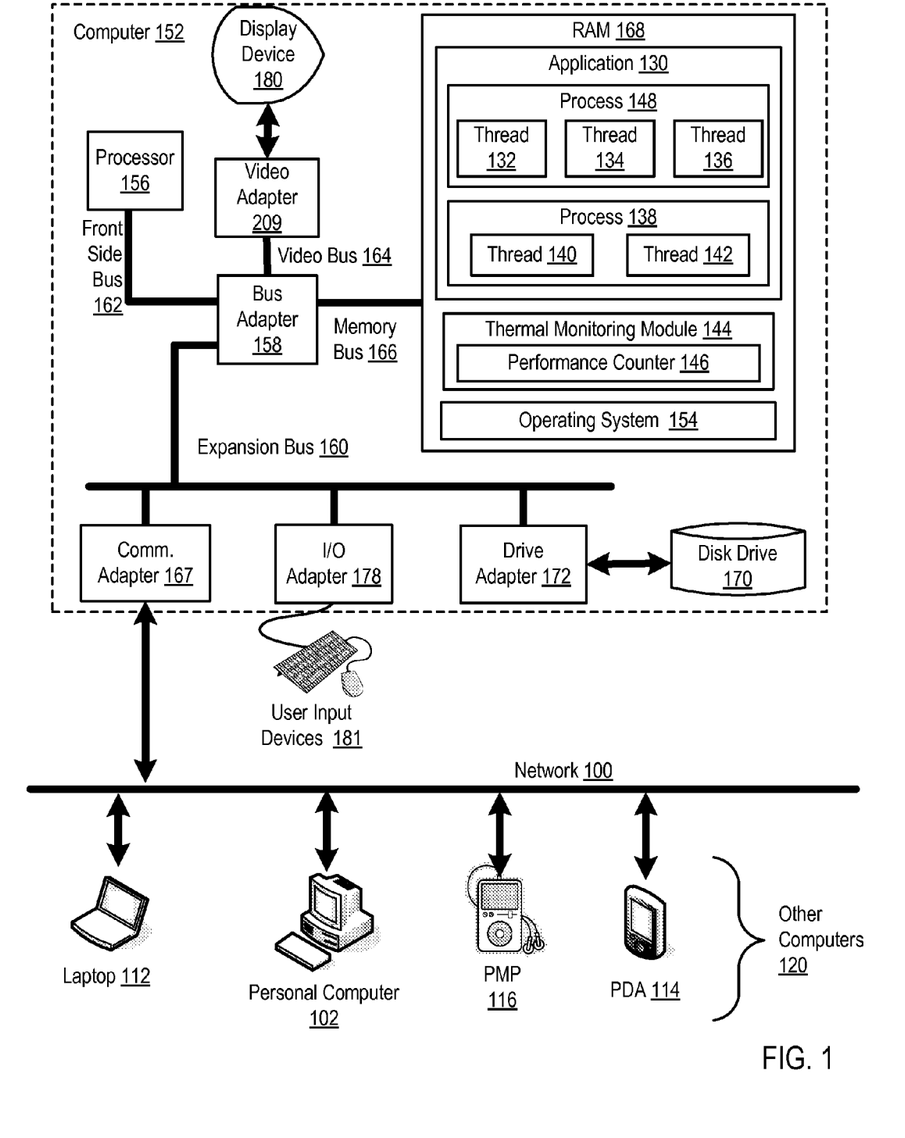
FIG. 1 sets forth a functional block diagram of a system for determining thermal characteristics of instruction sets according to embodiments of the present invention.

Exemplary methods, apparatus, and products for determining thermal characteristics of instruction sets in accordance with the present invention are described with reference to the accompanying drawings, beginning with FIG. 1. FIG. 1 sets forth a functional block diagram of a system for determining thermal characteristics of instruction sets according to embodiments of the present invention. An "instruction set" as the term is used in this specification refers to any identifiable group of computer program instructions. Instruction sets include one or more computer program instructions executed by a computer processor in a computer system. Each computer program instruction belongs to a class of instructions. A class of instructions is a category of instruction types. Such instruction classes may include, for example, floating point operations, integer math operations, load/store operations, and so on as will occur to those of skill in the art. Some classes of instructions typically produce a greater amount of heat when executed by a computer processor. Thermal characteristics of classes of instructions describe heat generated by execution of each class of instructions.

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). As mentioned above, instructions sets may be any identifiable group of computer program instructions. Each exemplary instruction of FIG. 1 includes one or more computer program instructions executed by a computer processor (156). Stored in RAM (168) of the exemplary computer (152) is an application (130), a module of computer program instructions including several exemplary instruction sets. The application (130) of FIG. 1 includes a process (148) that in turn includes several threads of execution (132, 134, 136). The application (130) of FIG. 1 also includes another process (138) which in turn includes several threads of execution (140, 142). Each thread may be considered an instruction set, each process may be considered an instruction set, and the application may be considered an instruction set in accordance with embodiments of the present invention.

Also stored RAM (168) is a thermal monitoring module (144), a module of computer program instructions for determining thermal characteristics of instruction sets according to embodiments of the present invention. The thermal monitoring module operates generally for determining thermal characteristics of instruction sets according to embodiments of the present invention by tracking, in a performance counter (146), a number of classes of instructions run during execution of a plurality of instruction sets; identifying, for each instruction set, from the performance counter, a number of each class of instructions run during execution of the instruction set; and ranking the instruction sets in dependence upon the number of each class of instructions run during execution of each instruction set and a profile of thermal characteristics of classes of instructions.

Also stored in RAM (168) is an operating system (154). Operating systems useful determining thermal characteristics of instruction sets according to embodiments of the present invention include UNIX™, Linux™, Microsoft XP™, AIX™, IBM's i5/OS™, and others as will occur to those of skill in the art. The operating system (154), application (130), thermal monitoring module (144), and performance counter (146) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for determining thermal characteristics of instruction sets according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (120) and for data communications with a data communications network (100). Such exemplary computers include a laptop (112), a personal computer (102), a personal media player ('PMP') (116), a personal digital assistant (114) and the like. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for determining thermal characteristics of instruction sets according to embodiments of the present invention include modems for wired dial-up communications, Ethernet (IEEE 802.3) adapters for wired data communications network communications, and 802.11 adapters for wireless data communications network communications.

The arrangement of computers and other devices making up the exemplary system illustrated in FIG. 1 are for explanation, not for limitation. Data processing systems useful according to various embodiments of the present invention may include additional servers, routers, and other devices, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
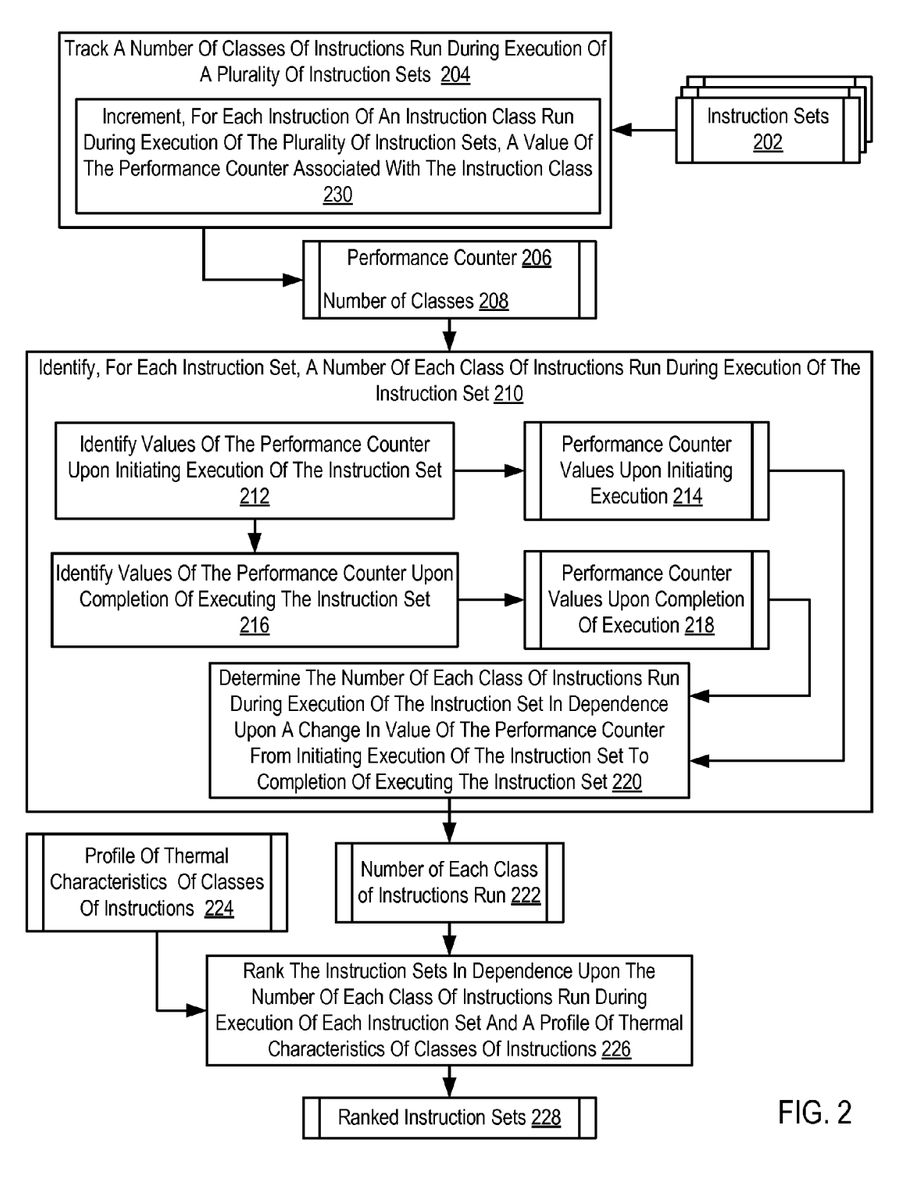
FIG. 2 sets forth a flow chart illustrating an exemplary method for determining thermal characteristics of instruction sets according to embodiments of the present invention.

For further explanation, FIG. 2 sets forth a flow chart illustrating an exemplary method for determining thermal characteristics of instruction sets according to embodiments of the present invention. As mentioned above, an "instruction set" as the term is used in this specification refers to any identifiable group of computer program instructions. Examples of such instruction sets include applications, processes, threads of execution, and others as will occur to those of skill in the art. The exemplary instruction sets (202) of FIG. 2 include one or more computer program instructions executed by a computer processor in a computer system.

The method of FIG. 2 includes tracking (204), in a performance counter (206), a number (208) of classes of instructions run during execution of a plurality of instruction sets (202). A performance counter is a data structure that includes values representing the number of classes of instruction run. A performance counter may be implemented, for example, as an array including elements associated with each class of instruction, each element being a value of the number of instructions of the associated class run. Such an array for example may include an element associated with floating point operations. Such an element may include a value representing the number of floating point operations run. A performance counter may be implanted in a special-purpose register of a computer processor. Such performance counters are often relied upon by users when conducting low-level performance analysis or tuning of computer programs or computer hardware. Such hardware counters provide low-overhead access to performance information related to a computer processors function units, caches, main memory, and so on.

In the method of FIG. 2, tracking (204) a number (208) of classes of instructions run during execution of a plurality of instruction sets (202) is carried out by incrementing (230), for each instruction of an instruction class run during execution of the plurality of instruction sets (202), a value of the performance counter (206) associated with the instruction class. For every floating point operation executed during the running of the instruction set, for example, the value of the element in the performance counter associated with floating point operations is incremented.

The method of FIG. 2 also includes identifying (210), for each instruction set (202), from the performance counter (206), a number of each class of instructions run (222) during execution of the instruction set. In the method of FIG. 2, identifying (210), for each instruction set (202), from the performance counter (206), a number of each class of instructions run (222) during execution of the instruction set is carried out by identifying (212), for each instruction set (202), values (214) of the performance counter (206) upon initiating execution of the instruction set (202); identifying (216) values (218) of the performance counter (206) upon completion of executing the instruction set (202); and determining the number (222) of each class of instructions run during execution of the instruction set (202) in dependence upon a change in the values of the performance counter from initiating execution of the instruction set to completion of executing the instruction set. A performance counter in accordance with embodiments of the present invention may constantly track the number of classes of instructions run independently of whether the instructions are part of a particular instruction set. Such a performance counter, therefore, represents at any given time the number of classes of instructions run during the execution of all executed instruction sets. Identifying only the number of classes of instructions run for a particular set of instructions therefore may be determined by the change in the value of the performance counter from initiating execution of the instruction set to completion of execution of the instruction set.

The method of FIG. 2 also includes ranking (226) the instruction sets (202) in dependence upon the number (222) of each class of instructions run during execution of each instruction set (202) and a profile (224) of thermal characteristics of classes of instructions. A profile of thermal characteristics of classes of instructions is a data structure including information describing thermal characteristics of particular classes of instructions. As mentioned above, some classes of instructions produce more heat when executed by a computer processor than other classes of instructions. A thermal profile according to embodiments of the present invention identifies the differences in heat production attributed to each particular class. More specifically, a thermal profile according to embodiments of the present invention may include information describing an association between weights and classes. Such weights may be used to calculate a score for classes of instructions which in turn may be used in ranking instruction sets.

Instruction sets may be ranked in any order useful for managing workflow of such instruction sets or analyzing such instructions sets. Instructions sets may be ranked in order of ascending heat generation. That is, an instruction set having the lowest amount of heat generation relative to other instruction sets would be ranked the highest, while the instruction set having the highest amount of heat generation relative to the other instruction sets would be ranked the lowest. Alternatively, the instruction sets may be ranked in order of descending heat generation with an instruction set having the highest amount of heat generation relative to other instruction sets ranked the highest, while the instruction set having the lowest amount of heat generation relative to the other instruction sets ranked the lowest. Although only a few methods of ranking instructions sets are described here for clarity, readers of skill in the art will recognize that other methods of ranking instructions sets may be useful in accordance with embodiments of the present invention and each such method is well within the scope of the present invention.

Figure 3:
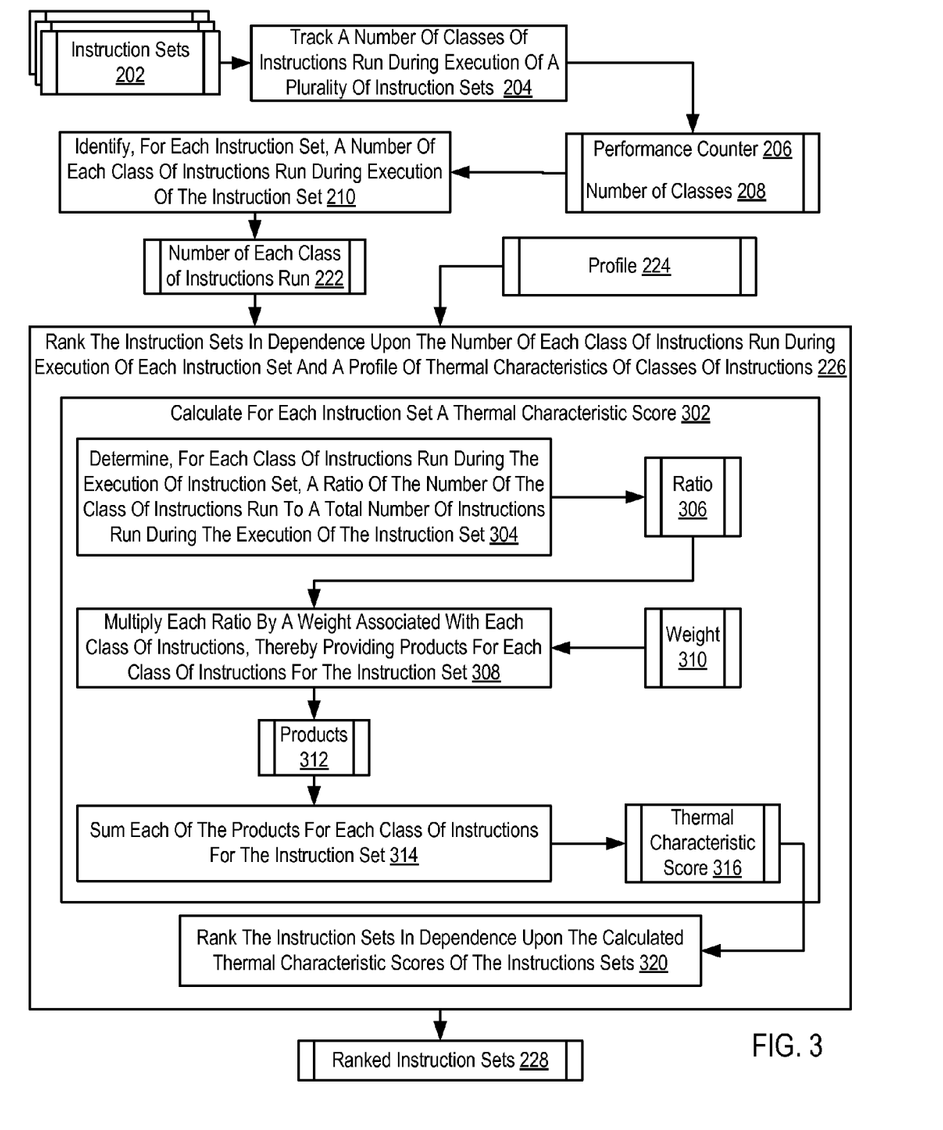
FIG. 3 sets forth a flow chart illustrating a further exemplary method for determining thermal characteristics of instruction sets according to embodiments of the present invention.

For further explanation, FIG. 3 sets forth a flow chart illustrating a further exemplary method for determining thermal characteristics of instruction sets according to embodiments of the present invention. The method of FIG. 3 is similar to the method of FIG. 2 in that the method of FIG. 3 also includes tracking (204), in a performance counter (206), a number (208) of classes of instructions run during execution of a plurality of instruction sets (202); identifying (210), for each instruction set (202), from the performance counter (206), a number (222) of each class of instructions run during execution of the instruction set (202); and ranking (226) the instruction sets (202) in dependence upon the number (222) of each class of instructions run during execution of each instruction set (202) and a profile (224) of thermal characteristics of classes of instructions.

The method of FIG. 3 differs from the method of FIG. 2, however, in that in the method of FIG. 3 ranking (226) the instruction sets (202) in dependence upon the number (222) of each class of instructions run during execution of each instruction set (202) and a profile (224) of thermal characteristics of classes of instructions is carried out by calculating (302) for each instruction set (202) a thermal characteristic score (316) and ranking (320) the instruction sets (202) in dependence upon the calculated thermal characteristic scores (316) of the instructions sets (202).

In the method of FIG. 3 calculating (302) for each instruction set (202) a thermal characteristic score (316) includes determining (304), for each class of instructions run during the execution of the instruction set (202), a ratio (306) of the number of the class of instructions run to a total number of instructions run during the execution of the instruction set. If 30 floating point operations are run during the execution of an instruction set and such an instruction set includes 100 instruction, the ratio of the number of class of instructions run to a total number of instruction run during the execution of the instruction set is 0.3 or 30 percent.

In the method of FIG. 3, calculating (302) for each instruction set (202) a thermal characteristic score (316) also includes multiplying (308) each ratio (306) by a weight (310) associated with each class of instructions (202), thereby providing products (312) for each class of instructions for the instruction set (202). Weights for each class of instruction may be included in a thermal profile as mentioned above. Such weights characterize the amount of heat generated by the particular class of instructions which the weight is associated. Because floating point operations generate more heat than load/store operations which in turn generate more heat than integer math operations, an exemplary weight associated with floating point operations may be three, an exemplary weight associated with load/store operations may be two, and an exemplary weight associated with integer math operations may be one. Consider, as an example, an instruction set having 30 floating point operations, 50 load store operations, and 20 integer math operations. Products for the exemplary instruction set produced by multiplying weights of each class of instructions by ratios of the number of class of instructions to the total number of instructions include a product for floating point operations of 0.6, a product for load/store operations, of one, and a product for integer math operations of 0.2.

In the method of FIG. 3, calculating (302) for each instruction set (202) a thermal characteristic score (316) also includes summing each of the products for each class of instructions for the instruction set. Continuing with above example instruction set having products of 0.6, 1, and 0.2, the sum of the three products, and therefore the thermal characteristic score for the example instruction set, is 1.8.

Ranking (320) the instruction sets (202) in dependence upon the calculated thermal characteristic scores (316) of the instructions sets (202) may be carried out by ranking in order of ascending or descending thermal characteristics scores. Instruction sets may also be ranked, for example, by determining, for each instruction set a ratio of a number of instructions of a "hot" instruction class to the total number instructions run during execution of the instruction set, and ranking the instruction sets in dependence upon the ratios. Instruction classes may be identified as "hot" in the thermal profile. A "hot" instruction class may be the class of instructions that typically generates the greatest amount of heat when executed by a computer processor. Although typically not as precise as the calculation described above using weights for each instruction class, ranking instruction sets in dependence upon the percentage of instructions of "hot" instruction classes run during execution of the instruction set may require less computational overhead and still provide a ranking of instructions sets in dependence upon thermal characteristics of classes of instructions.

Figure 4:
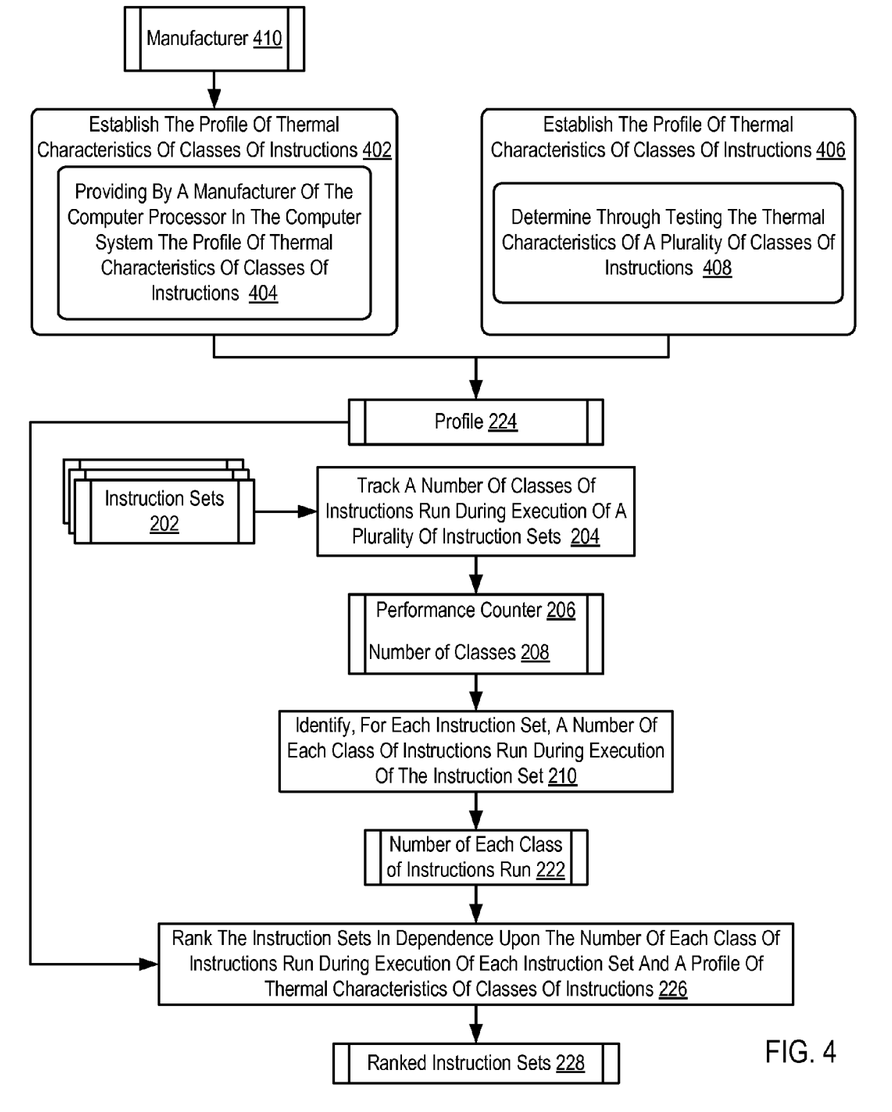
FIG. 4 sets forth a flow chart illustrating a further exemplary method for determining thermal characteristics of instruction sets according to embodiments of the present invention.

For further explanation, FIG. 4 sets forth a flow chart illustrating a further exemplary method for determining thermal characteristics of instruction sets according to embodiments of the present invention. The method of FIG. 4 is similar to the method of FIG. 2 in that the method of FIG. 4 also includes tracking (204), in a performance counter (206), a number (208) of classes of instructions run during execution of a plurality of instruction sets (202); identifying (210), for each instruction set (202), from the performance counter (206), a number (222) of each class of instructions run during execution of the instruction set (202); and ranking (226) the instruction sets (202) in dependence upon the number (222) of each class of instructions run during execution of each instruction set (202) and a profile (224) of thermal characteristics of classes of instructions. The method of FIG. 4 differs from the method of FIG. 3, however, in that the method of FIG. 4 includes several alternative methods of establishing the profile of thermal characteristics of classes of instructions.

In the method of FIG. 4, establishing (402) the profile (224) of thermal characteristics of classes of instructions may be carried out by providing (404) by a manufacturer (410) of the computer processor in the computer system the profile (224) of thermal characteristics of classes of instructions. Such a profile may describe thermal characteristics associated with all computer processors of a particular type or model. Such a thermal profile may describe thermal characteristics of all Intel™ Core 2 Duo processors or all PowerPC processors.

As an alternative to providing by a manufacturer the thermal profile, in the method of FIG. 4, establishing (406) the profile (224) of thermal characteristics of classes of instructions may also be carried out by determining (406) through testing the thermal characteristics of a plurality of classes of instructions. Such testing of the thermal characteristics of a plurality of classes of instructions may include running a number of instructions of each class of instructions, monitoring the temperature of the computer processor executing such instructions. Such testing may provide a profile for a particular computer processor installed in a particular computer. That is, such testing does not provide a thermal profile for an entire type or model of computer processor, such as a profile provided by a manufacturer of a computer processor, but rather such testing is associated only with a specific processor.

In view of the explanations set forth above, readers will recognize that the benefits of determining thermal characteristics of instruction sets according to embodiments of the present invention include:

providing a workflow management tool a description of thermal characteristics of particular sets of instructions for use in scheduling execution of such instruction sets;

providing a user with a description of thermal characteristics of particular sets of instructions for use in optimizing the sets of instructions to reduce heat generation in a computer processor; and other benefits as will occur to those of skill in the art.

Exemplary embodiments of the present invention are described largely in the context of a fully functional computer system for determining thermal characteristics of instruction sets. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of determining thermal characteristics of instruction sets, the instruction sets comprising one or more computer program instructions executed by a computer processor, the method comprising:

tracking, in a performance counter, a number of classes of instructions run during execution of a plurality of instruction sets;

identifying, for each instruction set, from the performance counter, a number of each class of instructions run during execution of the instruction set; and ranking the instruction sets in dependence upon the number of each class of instructions run during execution of each instruction set and a profile of thermal characteristics of classes of instruction, further comprising calculating for each instruction set a thermal characteristic score, including:

determining, for each class of instructions run during the execution of the instruction set, a ratio of the number of the class of instructions run to a total number of instructions run during the execution of the instruction set;

multiplying each ratio by a weight associated with each class of instructions, thereby providing products for each class of instructions for the instruction set;

summing each of the products for each class of instructions for the instruction set; and ranking the instruction sets in dependence upon the calculated thermal characteristic scores of the instructions sets.

2. The method of claim 1 wherein identifying, for each instruction set, from the performance counter, a number of each class of instructions run during execution of the instruction set further comprises:
  identifying, for each instruction set, values of the performance counter upon initiating execution of the instruction set;
  identifying values of the performance counter upon completion of executing the instruction set; and
  determining the number of each class of instructions run during execution of the instruction set in dependence upon a change in the values of the performance counter from initiating execution of the instruction set to completion of executing the instruction set.

3. The method of claim 1 wherein tracking, in a performance counter, a number of classes of instructions run during execution of a plurality of instruction sets further comprises:
  incrementing, for each instruction of an instruction class run during execution of the plurality of instruction sets, a value of the performance counter associated with the instruction class.

4. The method of claim 1 further comprising:
  establishing the profile of thermal characteristics of classes of instructions including providing by a manufacturer of the computer processor the profile of thermal characteristics of classes of instructions.

5. The method of claim 1 further comprising:
  establishing the profile of thermal characteristics of classes of instructions including determining through testing the thermal characteristics of a plurality of classes of instructions.

6. An apparatus for determining thermal characteristics of instruction sets, the instruction sets comprising one or more computer program instructions executed by a computer processor, the apparatus comprising the computer processor, a computer memory operatively coupled to the computer processor, the computer memory having disposed within it computer program instructions capable of:
  tracking, in a performance counter, a number of classes of instructions run during execution of a plurality of instruction sets;
  identifying, for each instruction set, from the performance counter, a number of each class of instructions run during execution of the instruction set; and
  ranking the instruction sets in dependence upon the number of each class of instructions run during execution of each instruction set and a profile of thermal characteristics of classes of instructions, further comprising calculating for each instruction set a thermal characteristic score, including:
    determining, for each class of instructions run during the execution of the instruction set, a ratio of the number of the class of instructions run to a total number of instructions run during the execution of the instruction set;
    multiplying each ratio by a weight associated with each class of instructions, thereby providing products for each class of instructions for the instruction set;
    summing each of the products for each class of instructions for the instruction set; and
    ranking the instruction sets in dependence upon the calculated thermal characteristic scores of the instructions sets.

7. The apparatus of claim 6 wherein identifying, for each instruction set, from the performance counter, a number of each class of instructions run during execution of the instruction set further comprises:
  identifying, for each instruction set, values of the performance counter upon initiating execution of the instruction set;
  identifying values of the performance counter upon completion of executing the instruction set; and
  determining the number of each class of instructions run during execution of the instruction set in dependence upon a change in the values of the performance counter from initiating execution of the instruction set to completion of executing the instruction set.

8. The apparatus of claim 6 wherein tracking, in a performance counter, a number of classes of instructions run during execution of a plurality of instruction sets further comprises:
  incrementing, for each instruction of an instruction class run during execution of the plurality of instruction sets, a value of the performance counter associated with the instruction class.

9. The apparatus of claim 6 further comprising computer program instructions capable of:
  establishing the profile of thermal characteristics of classes of instructions including providing by a manufacturer of the computer processor the profile of thermal characteristics of classes of instructions.

10. The apparatus of claim 6 further comprising computer program instructions capable of:
  establishing the profile of thermal characteristics of classes of instructions including determining through testing the thermal characteristics of a plurality of classes of instructions.

11. A computer program product for determining thermal characteristics of instruction sets, the instruction sets comprising one or more computer program instructions executed by a computer processor, the computer program product comprising:
  a recordable computer readable storage medium that includes computer program instructions that, when executed by the computer processor, cause the computer processor to carry out the steps of:
  tracking, in a performance counter, a number of classes of instructions run during execution of a plurality of instruction sets;
  identifying, for each instruction set, from the performance counter, a number of each class of instructions run during execution of the instruction set; and
  ranking the instruction sets in dependence upon the number of each class of instructions run during execution of each instruction set and a profile of thermal characteristics of classes of instructions, further comprising calculating for each instruction set a thermal characteristic score, including:
    determining, for each class of instructions run during the execution of the instruction set, a ratio of the number of the class of instructions run to a total number of instructions run during the execution of the instruction set;
    multiplying each ratio by a weight associated with each class of instructions, thereby providing products for each class of instructions for the instruction set;
    summing each of the products for each class of instructions for the instruction set; and
    ranking the instruction sets in dependence upon the calculated thermal characteristic scores of the instructions sets.

12. The computer program product of claim 11 wherein identifying, for each instruction set, from the performance counter, a number of each class of instructions run during execution of the instruction set further comprises:

identifying, for each instruction set, values of the performance counter upon initiating execution of the instruction set;

identifying values of the performance counter upon completion of executing the instruction set; and determining the number of each class of instructions run during execution of the instruction set in dependence upon a change in the values of the performance counter from initiating execution of the instruction set to completion of executing the instruction set.

13. The computer program product of claim 11 wherein tracking, in a performance counter, a number of classes of instructions run during execution of a plurality of instruction sets further comprises:

incrementing, for each instruction of an instruction class run during execution of the plurality of instruction sets, a value of the performance counter associated with the instruction class.

14. The computer program product of claim 11 wherein the recordable computer readable storage medium further includes computer program instructions that, when executed by the computer processor, cause the computer processor to carry out the step of:

establishing the profile of thermal characteristics of classes of instructions including providing by a manufacturer of the computer processor the profile of thermal characteristics of classes of instructions.

15. The computer program product of claim 11 wherein the recordable computer readable storage medium further includes computer program instructions that, when executed by the computer processor, cause the computer processor to carry out the step of:

establishing the profile of thermal characteristics of classes of instructions including determining through testing the thermal characteristics of a plurality of classes of instructions.

* * * * *